(12) United States Patent
Deshpande et al.

(10) Patent No.: US 9,388,254 B2
(45) Date of Patent: *Jul. 12, 2016

(54) OLEFIN-BASED POLYMERS AND DISPERSION POLYMERIZATIONS

(75) Inventors: Kishori Deshpande, Lake Jackson, TX (US); Ravindra S. Dixit, Lake Jackson, TX (US); Pradeep Jain, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/991,836

(22) PCT Filed: Dec. 21, 2011

(86) PCT No.: PCT/US2011/066417
§ 371 (c)(1),
(2), (4) Date: Jun. 5, 2013

(87) PCT Pub. No.: WO2012/088235
PCT Pub. Date: Jun. 28, 2012

(65) Prior Publication Data
US 2013/0281643 A1    Oct. 24, 2013

Related U.S. Application Data

(60) Provisional application No. 61/577,232, filed on Dec. 19, 2011, provisional application No. 61/425,608, filed on Dec. 21, 2010.

(51) Int. Cl.
| | |
|---|---|
| *C08F 210/16* | (2006.01) |
| *C08F 2/14* | (2006.01) |
| *C08L 23/08* | (2006.01) |
| *C08F 4/76* | (2006.01) |
| *C08F 10/02* | (2006.01) |

(52) U.S. Cl.
CPC . *C08F 4/76* (2013.01); *C08F 10/02* (2013.01); *C08F 210/16* (2013.01)

(58) Field of Classification Search
CPC ................................. C08F 2/14; C08F 210/16
USPC .................... 526/87, 348.2; 524/543
See application file for complete search history.

(56) References Cited

U.S. PATENT DOCUMENTS

| | | | |
|---|---|---|---|
| 3,072,631 A * | 1/1963 | Joyner ........................... 526/158 |
| 3,502,633 A | 3/1970 | Schwaar et al. |
| 3,726,843 A | 4/1973 | Anolick et al. |
| 3,932,371 A | 1/1976 | Powers |
| 4,433,121 A | 2/1984 | Kabu et al. |
| 4,444,922 A | 4/1984 | Gutowski et al. |
| 4,623,712 A | 11/1986 | Irani et al. |
| 4,857,633 A | 8/1989 | Irani et al. |
| 5,272,236 A | 12/1993 | Lai et al. |
| 5,278,272 A | 1/1994 | Lai et al. |
| 5,565,533 A | 10/1996 | Galimberti et al. |
| 5,599,885 A | 2/1997 | Kawasaki et al. |
| 6,255,410 B1 | 7/2001 | Shigekauzu et al. |
| 6,680,361 B1 | 1/2004 | Cady et al. |
| 6,683,153 B1 | 1/2004 | Arlt et al. |
| 7,163,989 B2 | 1/2007 | Friedersdorf |
| 7,750,104 B2 | 7/2010 | Cady et al. |
| 8,202,953 B2 | 6/2012 | Konze et al. |
| 8,450,438 B2 | 5/2013 | Aboelella et al. |
| 9,040,605 B2 * | 5/2015 | Deshpande ............. C08F 10/02 523/300 |
| 2006/0009977 A1 | 1/2006 | Kato et al. |
| 2008/0033127 A1 | 2/2008 | Jiang et al. |
| 2008/0090974 A1 | 4/2008 | Brant et al. |
| 2009/0118466 A1 | 5/2009 | Jiang |
| 2009/0275711 A1 | 11/2009 | Winslow et al. |
| 2013/0261224 A1 | 10/2013 | Deshpande et al. |
| 2014/0364531 A1 | 12/2014 | Ito et al. |

FOREIGN PATENT DOCUMENTS

| | | |
|---|---|---|
| CA | 1203348 A1 | 4/1986 |
| CA | 2372121 A1 | 11/2000 |
| DE | 19905029 A1 | 11/2000 |
| EP | 0069593 A2 | 1/1983 |
| EP | 0149342 A2 | 7/1985 |
| EP | 0184935 A2 | 6/1986 |
| EP | 0877834 A1 | 11/1998 |
| EP | 1339756 A1 | 9/2003 |
| JP | 58-002307 | 7/1983 |

(Continued)

OTHER PUBLICATIONS

Van Vliet, et al The Use of Liquid-Liquid extraction in the EPDM Solution Polymerization Process, Ind. Eng. Chem. Res., 2001 p. 4586-4595.

Kiran et al, Miscibility, Phase Separation, and Phase Settlement Dynamics in Solutions of Ethylene-Propylene-Diene Monomer Elastomer in Propane, Ind & Eng Chem Res 2013, p. 1806-1818 V 52.

PCT/US2011/066417, International Search Report and Written Opinion of the International Searching Authority, Mailed Jul. 6, 2012.

(Continued)

*Primary Examiner* — Fred M Teskin

(57) ABSTRACT

The invention provides a polymerization process comprising polymerizing a reaction mixture comprising one or more monomer types, at least one catalyst, and at least one solvent, to form a polymer dispersion, and wherein the at least one catalyst is soluble in the at least one solvent, and wherein the polymer forms a dispersed phase in the solvent, and wherein the at least one solvent is a hydrocarbon. The invention provides a composition comprising an ethylene-based polymer comprising at least the following properties: a) a weight average molecular weight (Mw(abs)) greater than, or equal to, 60,000 g/mole; and b) a molecular weight distribution (Mw(abs)/Mn(abs)) greater than, or equal to, 2.3.

14 Claims, 4 Drawing Sheets

(56) References Cited

FOREIGN PATENT DOCUMENTS

| | | |
|---|---|---|
| WO | 1993011191 A1 | 6/1993 |
| WO | 97/19965 A1 | 6/1997 |
| WO | 02/34795 A1 | 5/2002 |
| WO | 2004/007574 A1 | 1/2004 |
| WO | 2004/026921 A1 | 4/2004 |
| WO | 2004/026923 A2 | 4/2004 |
| WO | 2006/009946 A2 | 1/2006 |
| WO | 2006/009977 A1 | 1/2006 |
| WO | 2006009942 A1 | 1/2006 |
| WO | 2006/019494 A1 | 2/2006 |
| WO | 2006/083303 A1 | 8/2006 |
| WO | WO 2007/136506 A2 * | 11/2007 |
| WO | 2008/076589 A1 | 6/2008 |
| WO | 2009026675 | 3/2009 |
| WO | 2009026677 A1 | 3/2009 |
| WO | 2009142730 A1 | 11/2009 |
| WO | 2015006456 A1 | 1/2015 |

OTHER PUBLICATIONS

PCT/US2011/066417, International Preliminary Report on Patentability, Mailed Jul. 4, 2013.

* cited by examiner

OLEFIN-BASED POLYMERS AND DISPERSION POLYMERIZATIONS

REFERENCE TO RELATED APPLICATIONS

The present application is a 371 application of International Application No. PCT/US11/66417, filed Dec. 21, 2011, which claims the benefit of U.S. Provisional Application No. 61/425,608, filed Dec. 21, 2010, and U.S. Provisional Application No. 61/577,232, filed Dec. 19, 2011.

BACKGROUND OF THE INVENTION

Solution polymerizations are typically used to form olefin-based polymers. However, such polymerizations are typically capital and energy intensive. There is a need for new olefin polymerization processes that reduce capital requirements, improve energy efficiency, and reduce volatile organic content in the final product. There is also a need for higher molecular weight ethylene-based polymers that have improved processing and improved toughness. Such polymers are needed in sealing applications which require tough, high molecular weight polymers. These polymers typically cannot be prepared using conventional solution polymerization processes, because the polymer viscosity limits the ability to process the polymer.

U.S. Publication No. 2008/0090974 discloses a process to polymerize olefins, comprising contacting propylene, at a temperature of 65° C. to 150° C., and a pressure of 1.72 to 34.5 MPa, with the following: 1) a catalyst system comprising one or more activators, and one or more nonmetallocene metal-centered, heteroaryl ligand catalyst compounds, 2) optionally one or more comonomers selected from ethylene and C4 to C12 olefins, 3) diluent or solvent, and 4) optionally a scavenger. The olefin monomers and any comonomers are present in the polymerization system at 30 weight percent or more, and the propylene is present in the feed at 80 weight percent or more. The polymerization occurs at a temperature above the solid-fluid phase transition temperature of the polymerization system, and at a pressure greater than 1 MPa below the cloud point pressure of the polymerization system, and the polymerization occurs at a temperature below the critical temperature of the polymerization system, or (preferably and) at a pressure below the critical pressure of the polymerization system.

U.S. Pat. No. 4,433,121 discloses a process for polymerizing a monomer under such conditions that the resulting polymer dissolves in the reaction medium. The polymerization is carried out in a polymerization zone at a temperature above the upper cloud point of said polymer solution, and under conditions which enable the polymer solution to be separated into two phases. The polymerization is carried out under stiffing conditions, which maintain the two phases, under said phase-separating conditions, in a dispersed and mixed state. The resulting polymer solution is sent to a separating zone located independently of said polymerization zone, thereby separating it into two phases, a polymer-rich liquid phase that is recovered, and a polymer-lean liquid phase that is recycled to the polymerization zone.

International Publication No. WO 2006/019494 discloses a process to polymerize olefins, comprising contacting, under supercritical conditions, olefin monomers with a catalyst compound, an activator, optional comonomer, and optional hydrocarbon diluent or hydrocarbon solvent. The polymerization takes place in the presence of a fluorinated hydrocarbon.

International Publication No. WO 2004/026923 discloses a process to produce propylene polymers, comprising contacting a metallocene catalyst compound, and an activator, in a reaction medium comprising propylene, from 0 to 30 volume percent of one or more solvents, and from 0 to 30 mole percent of one or more comonomers, under temperature and pressure conditions below the melting point of the propylene polymer. The temperature is at, or above, the critical temperature for the reaction medium, and the pressure is at least 500 kPa above the critical pressure of the reaction medium; or the temperature is 1° C. or more above the critical temperature for the reaction medium, and the pressure is at, or above, the critical pressure of the reaction medium; or the temperature is 1° C. or more above the critical temperature for the reaction medium, and the pressure is at least 500 kPa above the critical pressure of the reaction medium.

U.S. Pat. No. 6,255,410 discloses a process for continuously producing polyolefin comprising: (a) continuously feeding olefinic monomer and catalyst system of metallocene and cocatalyst; (b) continuously polymerizing monomer feed to provide a monomer-polymer mixture; and (c) continuously settling a two phase mixture into a continuous molten polymer phase and a continuous monomer vapor, which may, optionally, be recycled to (a). The monomer-polymer mixture is at a pressure below the cloud point pressure, to provide a polymer-rich phase and a monomer-rich phase, at a temperature above the melting point of the polymer.

International Publication No. WO 2008/076589 discloses a process for polymerizing olefins, comprising the steps of: (a) contacting, in one or more reactors, in a dense fluid homogeneous polymerization system, olefin monomers having three or more carbon atoms present at 30 weight percent or more (based upon the weight of the monomers and comonomers entering the reactor), with the following: 1) one or more catalyst compounds, 2) one or more activators, 3) from 0 to 50 mole percent comonomer (based upon the amount of the monomers and comonomers entering the reactor), and 4) from 0 to 40 weight percent diluent or solvent (based upon the weight of the polymerization system), at a temperature above the crystallization temperature of the polymerization system, and at a pressure no lower than 10 MPa below the cloud point pressure of the polymerization system, and less than 200 MPa. A reactor effluent comprising a polymer-monomer mixture is formed, and is optionally heated, after it exits the reactor, and before or after the pressure is reduced to form a two-phase mixture, comprising a polymer-rich phase and a monomer rich phase.

International Publication No. WO 2004/026921 discloses a process to polymerize olefins, comprising contacting, in a polymerization system, olefins having three or more carbon atoms, with a catalyst compound, activator, optionally comonomer, and optionally diluent or solvent, at a temperature above the cloud point temperature of the polymerization system, and at a pressure no lower than 10 MPa below the cloud point pressure of the polymerization system. The polymerization system comprises any comonomer present, any diluent or solvent present, the polymer product, and the olefins having three or more carbon atoms are present at 40 weight percent or more.

U.S. Pat. No. 5,599,885 discloses the preparation of polyolefin, which comprises polymerizing or copolymerizing olefin in the presence of a catalyst comprising a metallocene compound of a transition metal selected from the Group IVB of the periodic table, and an organoaluminum oxy-compound. The organoaluminum oxy-compound is added to the polymerization system in the form of a slurry, in an aliphatic hydrocarbon or alicyclic hydrocarbon, and the polymerization is carried out in the presence of the aliphatic hydrocarbon diluent or an alicyclic hydrocarbon diluent having a boiling point below 100° C.

U.S. Pat. No. 5,278,272 discloses elastic substantially linear olefin polymers which have very good processability, including processing indices (PI's) less than, or equal to, 70 percent of those of a comparative linear olefin polymer, and a critical shear rate, at onset of surface melt fracture, of at least 50 percent greater, than the critical shear rate, at the onset of surface melt fracture, of a traditional linear olefin polymer, at about the same melt index (I2) and molecular weight distribution. The polymers have higher "low/zero shear viscosity" and lower "high shear viscosity" than comparative linear olefin polymers.

U.S. Pat. No. 6,680,361 discloses shear-thinning ethylene/α-olefin and ethylene/α-olefin/diene interpolymers that do not include a traditional branch-inducing monomer, such as norbornadiene. Such polymers are prepared at an elevated temperature, in an atmosphere that has little, or no, hydrogen, using a constrained geometry complex catalyst and an activating cocatalyst.

International Publication WO 2011/002998 discloses ethylenic polymers comprising low levels of total unsaturation. Compositions using such ethylene polymers, and fabricated articles made from them, are also disclosed.

International Publication WO 2011/002986 discloses ethylene polymers having low levels of long chain branching. Films and film layers made from these polymers have good hot tack strength over a wide range of temperatures, making them good materials for packaging applications.

International Publication WO 2007/136497 discloses a catalyst composition comprising one or more metal complexes of a multifunctional Lewis base ligand, comprising a bulky, planar, aromatic- or substituted aromatic-group. Polymerization processes employing the same, and especially continuous, solution polymerization of one or more α-olefins, at high catalyst efficiencies, are also disclosed.

International Publication WO 2007/136496 discloses metal complexes of polyvalent aryloxyethers, appropriately substituted with sterically bulky substituents. These metal complexes possess enhanced solubility in aliphatic and cycloaliphatic hydrocarbons, and/or when employed as catalyst components for the polymerization of ethylene/α-olefin copolymers, produce products having reduced $I_{10}/I_2$ values.

International Publication WO 2007/136494 discloses a catalyst composition comprising a zirconium complex of a polyvalent aryloxyether, and the use thereof, in a continuous solution polymerization of ethylene, one or more $C_{3-30}$ olefins, and a conjugated or nonconjugated diene, to prepare interpolymers having improved processing properties.

Additional polymerization processes and/or polymers are described in the following references: U.S. Pat. Nos. 3,496, 135, 3,502,633, 3726843, 3932371, 4,444,922, 448,195, 4,623,712, 4,857,633, 6,683,153, 7,163,989; U.S. Publication No. 2009/0118466; European Patent Nos. 0149342B1, 0184935B1, 0877834B1, 1339756B1; International Publication Nos. 02/34795, 06/009946, 08/079,565, 11/008,837; Canadian Patent Application Nos. 1203348, 2372121; German Application No. 19905029A1 (machine translation); Japanese Patent Publication No. 58-002307 (Abstract); and Van Vliet et al., *The Use of Liquid-Liquid Extraction in the EPDM Solution Polymerization Process*, Ind. Eng. Chem. Res., 2001, 40, 4586-4595.

As discussed above, there is a need for new olefin polymerization processes that reduce capital requirements, improve energy efficiency, and reduce volatile organic content in the final product. In addition, the ethylene-based polymers of the art typically have lower molecular weights due to lower viscosities needed to run the polymerizations, and typically contain lower comonomer incorporation, which decreases the toughness of the polymer. As discussed, there remains a need for higher molecular weight ethylene-based polymers that have improved processibility and improved toughness. These needs have been met by the following invention.

SUMMARY OF INVENTION

The invention provides a polymerization process comprising polymerizing a reaction mixture comprising one or more monomer types, at least one catalyst, and at least one solvent, to form a polymer dispersion, and wherein the at least one catalyst is soluble in the at least one solvent, and wherein the polymer forms a dispersed phase in the solvent, and wherein the at least one solvent is a hydrocarbon.

The invention also provides a composition comprising an ethylene-based polymer comprising at least the following properties:

a) a weight average molecular weight (Mw(abs)) greater than, or equal to, 60,000 g/mole; and
b) a molecular weight distribution (Mw(abs)/Mn(abs)) greater than, or equal to, 2.3.

DETAILED DESCRIPTION

As discussed above, the invention provides a polymerization process comprising polymerizing a reaction mixture comprising one or more monomer types, at least one catalyst, and at least one solvent, to form a polymer dispersion, and wherein the at least one catalyst is soluble in the at least one solvent, and wherein the polymer forms a dispersed phase in the solvent, and wherein the at least one solvent is a hydrocarbon.

An inventive process may comprise a combination of two or more embodiments as described herein.

In one embodiment, the polymerization is not run in the supercritical region/conditions.

In one embodiment, the polymerization is operated under subcritical region/conditions. In a further embodiment, the polymerization is run above the "lower critical solution temperature" and below the "cloud point pressure."

Figure 1:
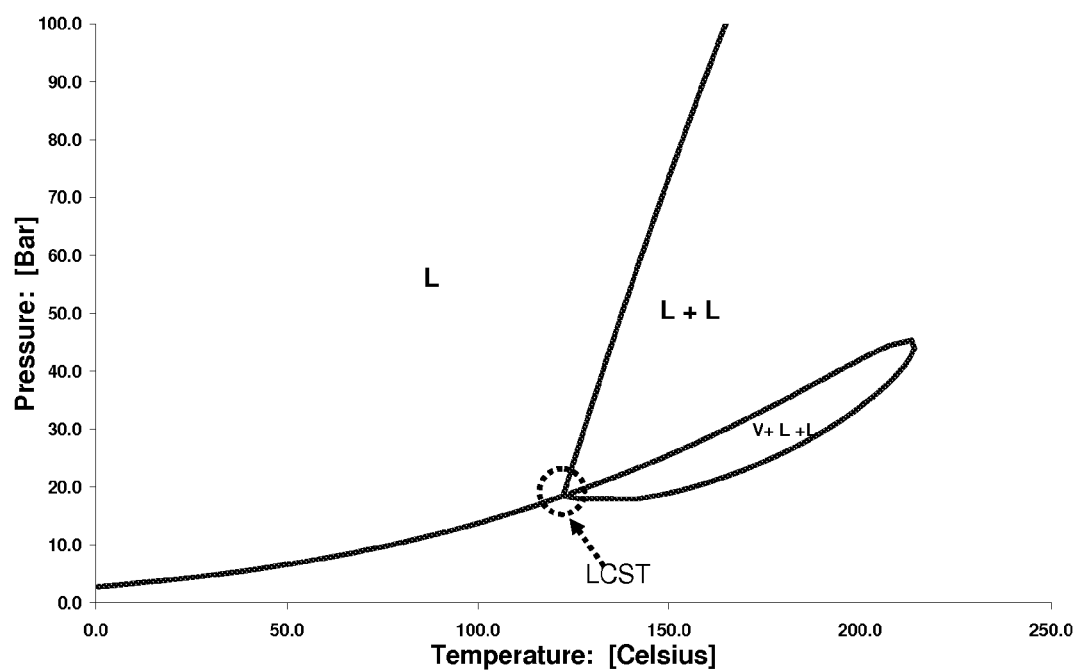
FIG. 1 is a phase diagram of a polymer-solvent system.

The polymerization is conducted in a region conducive for two liquid phase formation, typically at temperature and pressure higher than Lower Critical Solution Temperature (LCST). For example, see FIG. 1.

In a preferred embodiment, the dispersed phase is a liquid phase. In a further embodiment, the dispersion comprises at least two liquid phases, and preferably only two liquid phases.

In one embodiment, the polymerization is a continuous polymerization.

In one embodiment, the polymerization is a semi-batch polymerization.

The polymerization is not a solution polymerization.

The polymerization is not a slurry polymerization. Further, no particulate solids are formed in the polymerization reaction.

In one embodiment, the reaction mixture comprises less than 100 ppm, preferably less than 10 ppm, more preferably less than 1 ppm of a fluorocarbon, based on the weight of the reaction mixture.

In a preferred embodiment, reaction mixture does not comprise a fluorocarbon.

In one embodiment, the reaction mixture comprises less than 100 ppm, preferably less than 10 ppm, more preferably less than 1 ppm of a fluorohydrocarbon, based on the weight of the reaction mixture.

In a preferred embodiment, the reaction mixture does not comprise a fluorohydrocarbon.

In a preferred embodiment, the at least one catalyst is a single site catalyst.

In one embodiment, the catalyst is selected from metallocene catalysts, constrained geometry catalysts, and polyvalent aryloxyether compounds (post metallocene catalysts).

In one embodiment, the at least one catalyst is a polyvalent aryloxyether compound. Such suitable compounds are described in U.S. Publication No. 2005/0164872 and International Publication No. WO 2007/136494; each incorporated herein by reference.

In one embodiment, the at least one catalyst is a constrained geometry catalyst. Suitable constrained geometry catalysts are described in U.S. Pat. Nos. 5,272,236 and 5,278,272; each incorporated herein by reference.

In one embodiment, the reaction mixture comprises only one catalyst.

In one embodiment, catalyst selection allows polymerization at a temperature up to 220° C.

In one embodiment, catalyst selection allows polymerization at a temperature up to 210° C.

In one embodiment, catalyst selection allows polymerization at a temperature up to 200° C.

The catalyst preferably is not supported.

The catalyst is completely soluble in the polymerization solvent.

In one embodiment, the polymerization is run at a pressure P and at a temperature T, and wherein T is greater than the lower critical solution temperature (LCST).

In one embodiment, the pressure P is less than, or equal to, the pressure at the cloud point pressure at T.

In one embodiment, the T is less than, or equal to, 200° C., preferably less than, or equal to, 190° C.

In one embodiment, the P is less than, or equal to, 10 MPa, preferably less than, or equal to, 8 MPa.

In one embodiment, the polymerization pressure from 1 to 10 MPa, preferably from 1 to 8 MPa, more preferably from 1 to 5 MPa.

In one embodiment, the polymerization pressure from 2 to 10 MPa, preferably from 2 to 8 MPa, more preferably from 2 to 5 MPa, and even more preferably from 2 to 4 MPa.

In one embodiment, the polymerization pressure is from 2 to 6 MPa, preferably from 3 to 5 MPa.

In one embodiment, the polymerization pressure from 5 to 7.5 MPa.

In one embodiment, the polymerization temperature is greater than the highest melting point of the polymer, as determined by Differential Scanning calorimetry (DSC).

In one embodiment, the polymerization temperature is from 70° C. to 220° C., preferably from 80° C. to 220° C., and more preferably from 100° C. to 220° C., and even more preferably from 150° C. to 220° C.

In one embodiment, the polymerization temperature is from 60° C. to 200° C., preferably from 80° C. to 200° C., and more preferably from 100° C. to 200° C., and even more preferably from 150° C. to 200° C.

In one embodiment, the polymerization temperature greater than 60° C., preferably greater than 80° C., and more preferably greater than 90° C.

In one embodiment, the polymerization temperature greater than 100° C., preferably greater than 110° C., and more preferably greater than 120° C.

In one embodiment, the polymerization temperature greater than, or equal to, 150° C., preferably greater than, or equal to, 160° C., more preferably greater than, or equal to, 170° C.

An inventive process may comprise a combination of temperature and pressure as described herein.

In one embodiment, the polymerization temperature is from 170° C. to 190° C., the reactor pressure is from 5 to 7 MPa, and the solvent is present in an amount from 55 to 65 weight percent, based on the total weight of feed to the reactor.

In one embodiment, the polymerization temperature is from 100° C. to 120° C., the reactor pressure is from 3 to 5 MPa, and the solvent is present in an amount from 70 to 80 weight percent, based on the total weight of feed to the reactor.

In one embodiment, the solvent present in an amount from 50 to 85 weight percent, preferably from 55 to 80 weight percent, more preferably from 60 to 78 weight percent, based on the total weight of feed to the reactor.

In one embodiment, the solvent present in an amount greater than, or equal to, 68 weight percent, based on the total weight of feed to the reactor.

In one embodiment, the solvent present in an amount greater than, or equal to, 70 weight percent, based on the total weight of feed to the reactor.

In one embodiment, the solvent is an impurity in a monomer supply.

In one embodiment, the one or more monomers are present in an amount less than, or equal to, 40 weight percent, based on the weight of the total weight of feed to the reactor.

In one embodiment, the one or more monomers present in an amount less than, or equal to, 30 weight percent, based on the total weight of feed to the reactor.

In one embodiment, the one or more monomers present in an amount less than, or equal to, 20 weight percent, based on the total weight of feed to the reactor.

In one embodiment, the one or more monomers present in an amount less than, or equal to, 10 weight percent, based on the total weight of feed to the reactor.

In one embodiment, the phase fractions in the reactor can be estimated by using the Tangent plane criteria for Gibbs energy minimization: $G^{(III)} - G^{(I)} = \Sigma N_i (\Sigma y_{il} (\mu_{il} - \mu_i^{(I)}))$, where G is the Gibbs energy for the system, N is the total phase mole numbers, $\mu$ is the chemical potential, and y is the mole fraction of component "i" in liquid phase.

In one embodiment, the polymer concentration in the polymerization is less than, or equal to, 60 weight percent, based on the total weight of the polymer dispersion.

In one embodiment, the polymer concentration in the polymerization is less than, or equal to, 50 weight percent, based on the total weight of the polymer dispersion.

In one embodiment, the polymer concentration in the polymerization is less than, or equal to, 40 weight percent, based on the total weight of the polymer dispersion.

In one embodiment, the effective viscosity of the reaction mixture is less than, or equal to, 15 cP, preferably less than, or equal to, 10 cP, more preferably less than, or equal to, 6 cP.

In one embodiment, the polymer is an olefin-based polymer. In a further embodiment, the olefin-based polymer is an ethylene-based polymer or a propylene-based polymer.

In one embodiment, the polymer is an ethylene-based polymer. For example, an ethylene-based polymer as described herein.

In one embodiment, the polymer is a propylene-based polymer.

In one embodiment, the polymer is present in an amount from 30 to 40 weight percent, based on weight of the reaction mixture.

In one embodiment, the polymer has a density from 0.86 to 0.92 g/cc.

In one embodiment, the polymerization takes place in a reactor configuration selected from the group consisting of the following: (a) one reactor and (b) two or more reactors configured in series.

In one embodiment each reactor is a stirred tank reactor.

In one embodiment each reactor is an adiabatic reactor.

In a preferred embodiment, no gas phase is present in the reactor mixture under steady state conditions (constant temperature and constant pressure).

In a preferred embodiment, no molten polymer is present in the reaction mixture.

In a preferred embodiment, the polymer dispersion does not contain a molten polymer.

In a preferred embodiment, the polymer dispersion comprises solvent, and polymer.

In one embodiment, the polymer dispersion is stabilized by agitation. In a further embodiment, the agitation is produced by a high speed impeller.

In one embodiment, the polymer dispersed phase is removed from the reaction mixture by means of a decanter. In a further embodiment, the temperature of the decanter is the same as the polymerization temperature, and the pressure of the decanter is the same as the polymerization pressure.

In one embodiment, the solvent is removed from the polymer dispersion in one or two stages of devolatilizations. In a further embodiment, each devolatilization stage is operated at a temperature from 190° C. to 200° C.

An inventive process may comprise a combination of two or more embodiments as described herein.

The invention also provides a polymer formed from an inventive process described herein. For example, an ethylene-based polymer as described herein.

The invention also provides a composition comprising an inventive polymer formed from an inventive process described herein. In a further embodiment, the composition comprises one or more additives. Additives include, but are not limited to, stabilizers, plasticizers and fillers.

The invention also provides an article comprising at least one component formed from an inventive composition.

The invention also provides a composition comprising an ethylene-based polymer comprising at least the following properties:
 a) a weight average molecular weight (Mw(abs)) greater than, or equal to, 60,000 g/mole; and
 b) a molecular weight distribution (Mw(abs)/Mn(abs)) greater than, or equal to, 2.3.

An inventive composition may comprise a combination of two or more embodiments as described herein.

An inventive ethylene-based polymer may comprise a combination of two or more embodiments as described herein.

The inventive ethylene-based polymers are prepared by the inventive processes described herein.

In one embodiment, the ethylene-based polymer further comprises a density from 0.85 to 0.91 g/cc, or from 0.85 to 0.90 g/cc (1 cc=1 cm$^3$).

In one embodiment, the ethylene-based polymer is an ethylene/α-olefin interpolymer.

In one embodiment, the ethylene-based polymer is an ethylene/α-olefin copolymer.

In one embodiment, the α-olefin is selected from C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene, more preferably 1-butene, 1-hexene or 1-octene.

In one embodiment, the ethylene-based polymer has an α-olefin incorporation greater than, or equal to, 30 weight percent, based on the weight of the polymer.

In one embodiment, the ethylene-based polymer has an α-olefin incorporation greater than, or equal to, 32 weight percent, based on the weight of the polymer.

In one embodiment, the ethylene-based polymer has an α-olefin incorporation greater than, or equal to, 34 weight percent, based on the weight of the polymer.

In one embodiment, the ethylene-based polymer has a molecular weight distribution (Mw(abs)/Mn(abs)) from 2.3 to 5.0.

In one embodiment, the ethylene-based polymer has a molecular weight distribution (Mw(abs)/Mn(abs)) from 2.4 to 4.6.

In one embodiment, the ethylene-based polymer has a molecular weight distribution (Mw(abs)/Mn(abs)) from 2.5 to 4.4.

In one embodiment, the ethylene-based polymer has a density greater than 0.855 g/cc, and an α-olefin incorporation greater than, or equal to, 30 weight percent, based on the weight of the polymer.

In one embodiment, the ethylene-based polymer has a density greater than 0.855 g/cc, and an α-olefin incorporation greater than, or equal to, 31 or greater than, or equal to, 32, weight percent, based on the weight of the polymer.

In one embodiment, the ethylene-based polymer has a density greater than 0.860 g/cc, or greater than 0.865 g/cc, and an α-olefin incorporation greater than, or equal to, 31 or greater than, or equal to, 32, weight percent, based on the weight of the polymer.

In one embodiment, the ethylene-based polymer has a density greater than 0.855 g/cc, and a molecular weight distribution (Mw(abs)/Mn(abs)) greater than, or equal to, 2.4.

In one embodiment, the ethylene-based polymer has a density greater than 0.860 g/cc, or greater than 0.865 g/cc, and a molecular weight distribution (Mw(abs)/Mn(abs)) greater than, or equal to, 2.45 or greater than, or equal to, 5.0.

In one embodiment, the ethylene-based polymer alpha (α) parameter less 0.72.

In one embodiment, the ethylene-based polymer has a weight average molecular weight (Mw(abs)) greater than, or equal to, 70,000 g/mole, or greater than, or equal to, 75,000 g/mole, or greater than, or equal to, 80,000 g/mole.

In one embodiment, the ethylene-based polymer has a weight average molecular weight (Mw(abs)) greater than, or equal to, 90,000 g/mole, or greater than, or equal to, 100,000 g/mole.

In one embodiment, the ethylene-based polymer has a weight average molecular weight (Mw(abs)) from 60,000 to 500,000 g/mole, or from 70,000 to 450,000 g/mole, and a MWD greater than, or equal to, 2.3, or greater than, or equal to, 2.4.

In one embodiment, the ethylene-based polymer has a weight average molecular weight (Mw(abs)) from 60,000 to 500,000 g/mole, or from 70,000 to 450,000 g/mole, and an α-olefin incorporation greater than, or equal to, 30 or greater than, or equal to, 32 weight percent, based on the weight of the polymer.

In one embodiment, the ethylene-based polymer has an I10/I2 ratio greater than, or equal to, 8.0, or greater than, or equal to, 8.5.

In one embodiment, the ethylene-based polymer has an I10/I2 ratio greater than, or equal to, 10.0, or greater than, or equal to, 10.5.

An inventive ethylene-based polymer may comprise a combination of two or more embodiments as described herein.

In one embodiment, the composition further comprises at least one additive. In a further embodiment, the additive is selected from antioxidants, fillers, plasticizers, or combinations thereof.

An inventive composition may comprise a combination of two or more embodiments as described herein.

The invention also provides an article comprising at least one component formed from an inventive composition.

In one embodiment, the article is selected from a gasket or a profile.

An inventive article may comprise a combination of two or more embodiments as described herein.

Applicants have discovered that the inventive polymers have a unique combination of high molecular weight, broad molecular weight distribution, high comonomer incorporation, and sufficient long chain branching. The inventive polymers have good processability and can be used in applications that require good tensile strength and good toughness.

The inventive polymers are prepared from the inventive processes described herein.

It has been discovered that by operating the reactor with two liquid phases (solvent-rich and polymer-rich phase), it is possible to (i) eliminate viscosity limitations of the solution process, and (ii) simplify downstream processing by delivering a concentrated polymer stream to units downstream of the reactor(s). The polymer-rich stream can be further concentrated with minimal or no supply of heat, downstream of the reactor, through only the use of pressure let-downs devices. There is potential for nearly a 75 percent reduction in energy requirements, compared to other polymerization processes.

It has been discovered that for an inventive polymerization (forming a polymer dispersion), the reactor operates above a critical temperature and pressure, inducing poor solubility for the polymer in an appropriate solvent. No discernable FTIR spectrum is obtained from the dispersion polymerization. The polymer-rich, high viscosity phase is dispersed as droplets in a continuous low viscosity solvent phase. The effective viscosity is low, thus eliminating the viscosity limitations of current loop reactors. Further, as the two-phases differ in density, the polymer-rich phase can be decanted, post-reactor, to deliver a concentrated polymer phase, which can be devolatilized with minimal heat addition (temperatures<200° C.). The solvent-rich stream from the decanter can be cooled to remove the heat of polymerization, and re-cycled (untreated) back to the reactor.

The inventive process allows for the appropriate solvent selection to lower the critical temperature and pressure conditions for two phase formation, and hence, provides a less energy intensive, more efficient polymer recovery.

The inventive process also allows for the synthesis of a high molecular weight polymer without viscosity limitations.

The inventive process eliminates viscosity limitations observed in current loop reactors operating with heavy hydrocarbon solvents, such as ISOPAR E.

The inventive process significantly reduces capital and energy costs associated with polymerization reactions.

The inventive process lowers the volatile organic content (VOC) in final polymer, leading to polymers with improved properties.

Solvents

Solvents include, but are not limited to, one or more of C2-C24 alkanes, such as ethane, propane, n-butane, i-butane, n-pentane, i-pentane, n-hexane, i-hexane, mixed hexanes, n-octane, i-octane, mixed octanes, cyclopentane, cyclohexane, etc., and single-ring aromatics, such as toluene and xylenes, and C4 to C150 isoparaffins.

Preferred solvents include, one or more of C2-C24 alkanes, such as ethane, propane, n-butane, i-butane, n-pentane, i-pentane, n-hexane, i-hexane, mixed hexanes, n-octane, i-octane, mixed octanes, and more preferably i-pentane.

Suitable solvent include, but are not limited to, those shown below in Table 1.

TABLE 1

Solvents

| Solvent | T(° C.) LCEP | P(Bar) LCEP |
|---|---|---|
| Methyl cyclohexane | 275 | 43 |
| Cyclohexane | 256.5 | 44.1 |
| Octane | 240 | 27.1 |
| 2-Methyl Heptane | 232 | 25.7 |
| Cyclopentane | 214 | 41.1 |
| Iso-Octane | 203 | 21.8 |
| Hexane | 175 | 21 |
| Iso-Hexane | 152.2 | 17.5 |
| Pentane | 148.4 | 21.8 |
| Iso-pentane | 110.4 | 14.3 |

LCEP = Lower Critical End Point

Monomers

The one or more monomer types include, but are not limited to, ethylenically unsaturated monomers, conjugated or nonconjugated dienes, polyenes, and combinations thereof.

In one embodiment, the one or more monomer types are selected from the group consisting of ethylene, C3-C20 α-olefins, styrene, alkyl-substituted styrene, dienes, naphthenics, and combinations thereof.

In one embodiment, the one or more monomer types are selected from the group consisting of ethylene, C3-C20 α-olefins, styrene, alkyl-substituted styrene, dienes, and combinations thereof.

In one embodiment, the one or more monomer types are selected from the group consisting of ethylene, C3-C20 α-olefins, dienes, and combinations thereof.

In one embodiment, the one or more monomer types are selected from the group consisting of ethylene, C3-C20 α-olefins, and combinations thereof.

In one embodiment, the one or more monomer types are selected from the group consisting of ethylene, C3-C10 α-olefins, and combinations thereof.

In one embodiment, the one or more monomer types are ethylene, and a C3-C20 α-olefin, and preferably a C3-C10 α-olefin.

In one embodiment, the one or more monomer types are ethylene and an α-olefin selected from the group consisting of propylene, 1-butene, 1-hexene, and 1-octene.

In one embodiment, the one or more monomer types are ethylene, an α-olefin selected from the group consisting of propylene, 1-butene, 1-hexene, and 1-octene, and a diene.

In one embodiment, the one or more monomer types are ethylene, propylene, and a diene, and preferably 5-ethylidene-2-norbornene (ENB).

In one embodiment, the one or more monomer types are propylene, and ethylene or a C4-C20 α-olefin, and preferably a C4-C10 α-olefin.

In one embodiment, the one or more monomer types are propylene, and ethylene.

In one embodiment, the one or more monomer types are propylene and an α-olefin selected from the group consisting of 1-butene, 1-hexene, and 1-octene.

Polymers

In one embodiment, the polymer is an ethylene-based polymer. In a further embodiment, the ethylene-based polymer is an ethylene/α-olefin interpolymer or an ethylene/α-olefin/diene interpolymers.

Ethylene/α-Olefin Interpolymers

Ethylene/α-olefin interpolymers include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene, or 1-butene, 1-hexene or 1-octene, or 1-octene.

Preferred copolymers include ethylene/propylene (EP) copolymers, ethylene/butene (EB) copolymers, ethylene/hexene (EH) copolymers, ethylene/octene (EO) copolymers.

An ethylene/α-olefin interpolymer may comprise a combination of two or more embodiments described herein.

An ethylene/α-olefin copolymer may comprise a combination of two or more embodiments described herein.

Ethylene/α-Olefin/Diene Interpolymers

The ethylene/α-olefin/diene interpolymers have polymerized therein C2 (ethylene), at least one α-olefin and a diene. Suitable examples of α-olefins include the C3-C20 α-olefins. Suitable examples of suitable dienes include the C4-C40 non-conjugated dienes.

The α-olefin is preferably a C3-C20 α-olefin, preferably a C3-C16 α-olefin, and more preferably a C3-C10 α-olefin. Preferred C3-C10 α-olefins are selected from the group consisting of propylene, 1-butene, 1-hexene and 1-octene, and more preferably propylene. In a preferred embodiment, the interpolymer is an EPDM polymer. In a further embodiment, the diene is 5-ethylidene-2-norbornene (ENB).

In one embodiment, the diene is a C6-C15 straight chain, branched chain or cyclic hydrocarbon diene. Illustrative non-conjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a non-conjugated diene selected from ENB, dicyclopentadiene, 1,4-hexadiene, or 7-methyl-1,6-octadiene, and preferably, ENB, dicyclopentadiene or 1,4-hexadiene, more preferably ENB or dicyclopentadiene, and even more preferably ENB.

In one embodiment, the ethylene/α-olefin/diene interpolymer comprises a majority amount of polymerized ethylene, based on the weight of the interpolymer. In a further embodiment, the interpolymer is an EPDM terpolymer. In a further embodiment, the diene is 5-ethylidene-2-norbornene (ENB).

An ethylene/α-olefin/diene interpolymer may comprise a combination of two or more embodiments described herein.

An EPDM may comprise a combination of two or more embodiments described herein.

Propylene-based Polymers

In one embodiment, the polymer is a propylene-based polymer. In a further embodiment, the propylene-based polymer is a propylene/α-olefin interpolymer, and preferably a copolymer, or a propylene/ethylene interpolymer, and preferably a copolymer.

Preferred comonomers include, but are not limited to, C2 and C4-C20 α-olefins, and preferably C2 and C4-C10 α-olefins. Preferred comonomers include ethylene, 1-butene, 1-pentene, 1-hexene, 1-heptene and 1-octene, and more preferably include ethylene, 1-butene, 1-hexene and 1-octene, and even more preferably ethylene.

Catalyst Systems

In a preferred embodiment, the at least one catalyst is a single site catalyst.

In one embodiment, the catalyst is selected from metallocene catalysts, constrained geometry catalysts, and polyvalent aryloxyether compounds (post metallocene catalysts).

In one embodiment, the at least one catalyst is a constrained geometry catalyst. Suitable constrained geometry catalysts are described in U.S. Pat. Nos. 5,272,236 and 5,278,272; each incorporated herein by reference.

In one embodiment, the at least one catalyst is a polyvalent aryloxyether compound. Suitable polyvalent aryloxyether compounds are described in U.S. Publication No. 2005/0164872 and International Publication No. WO 2007/136494; each incorporated herein by reference.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that contains at least a majority weight percent, based on the weight of the polymer, polymerized olefin (for example, ethylene or propylene), and, optionally, one or more additional comonomers.

The term "ethylene-based polymer," as used herein, refers to a polymer that contains at least a majority weight percent polymerized ethylene (based on the weight of polymer), and, optionally, one or more additional comonomers.

The term "propylene-based polymer," as used herein, refers to a polymer that contains at least a majority weight percent polymerized propylene (based on the weight of polymer), and, optionally, one or more additional comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer," comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer," comprises a majority weight percent of ethylene (based on the weight of the terpolymer).

The term "polymer-rich phase," as used herein, in relation to two or more phases under consideration, refers to the phase containing the greater concentration of polymer, as measured by its weight fraction, based on the total weight of this phase.

The term "solvent-rich phase," as used herein, in relation to two or more phases under consideration, refers to the phase containing the greater concentration of solvent as measured by its weight fraction, based on total weight of this phase.

The term "phase," as used herein, refers to a region of space (a thermodynamic system), throughout which all physical properties of a material are uniform. Examples of physical properties include density, index of refraction, and chemical composition.

A liquid-liquid phase is a combination of two separate liquid phases which are not miscible.

The term "solvent," as used herein, refers to a substance (for example, a hydrocarbon (excluding monomer and comonomer)) that dissolves a species of interest, like a monomer and/or catalyst, resulting in a liquid phase.

The term "hydrocarbon," as used herein, refers to a chemical compound or molecule that contains only hydrogen and carbon atoms.

The term "dispersion polymerization," as used herein, refers to a polymerization process, in which the majority (by weight) of the formed polymer is insoluble in the polymerization solvent.

The term "polymer dispersion," as used herein, refers to a reaction mixture comprising the majority amount (by weight) of polymer-rich phase insoluble in the solvent-rich phase.

The term "solution polymerization," as used herein, refers to a polymerization process, in which the formed polymer is dissolved in the polymerization solvent.

Lower Critical Solution Temperature (LCST), as used herein, is defined as the temperature, above which, a solution of fixed composition, at a fixed pressure, separates into two liquid phases, and, below this temperature, the solution exists as a single liquid phase.

The term "polymerization system," as used herein, refers to a mixture comprising monomers, solvent and catalyst, and which will undergo polymerization reaction under appropriate conditions. The polymerization system corresponds to the total feed to the reactor.

The term "adiabatic reactor," as used herein, refers to a reactor which has no active heat removal mechanism and no active heat addition mechanism.

The term "single phase polymer solution," as used herein, refers to the complete dissolution of polymer in one or more solvents (typically much lower in molecular weight than polymer) to form a homogeneous (most often in liquid state) phase.

The phrase "concentration of polymer in the polymer-rich phase," as used herein, refers to the weight fraction of the polymer, based on the total weight of the solution containing the polymer (polymer-rich phase).

The phrase "concentration of polymer in the solvent-rich phase," as used herein, refers to the weight fraction of the polymer, based on the total weight of the solution containing the polymer (solvent-rich phase).

The term "subcritical region," as defined herein, refers to a polymerization temperature below the critical temperature of the polymerization medium (defined as the mixture of solvent(s), monomer and comonomer(s) (no catalyst(s) or cocatalyst(s)), and a polymerization pressure below the critical pressure of the polymerization medium.

The term "critical temperature," as used herein, refers to the temperature of the polymerization medium, above which, the polymerization medium does not phase separate, regardless of any pressure change.

The term "critical pressure," as used herein, refers to the pressure of the polymerization medium, above which, the polymerization medium does not phase separate, regardless of any temperature change.

The term "cloud point pressure," are used herein, refers to the pressure, below which, the polymer solution of a fixed composition at a fixed temperature, separates into two liquid phases. Above this pressure, the polymer solution is a single liquid phase.

The term "cloud point temperature," as used herein, refers to the temperature (threshold temperature) above which, the polymer solution of a fixed composition at a fixed pressure, separates into two liquid phases. Below this temperature, the polymer solution is a single liquid phase. In addition, the cloud point temperature may also be a ceiling temperature, below which, two phases exist, and above which, one phase exists.

The term "bubble point pressure," as used herein, refers to that pressure, at constant temperature, at which, for a two liquid phase solution, a first bubble of vapor appears.

The term "effective viscosity," as used herein, refers to the viscosity of a dispersion containing two or more liquid phases as calculated by the fraction of each phase, and where a dense phase is fully dispersed in a continuous phase.

The phrase "catalyst soluble in the solvent," as used herein, refers to the amount of catalyst that can be dissolved in the solvent.

The term "dispersed phase," as used herein, refers to the undissolved liquid that is distributed in a solvent or continuous phase.

The term "reaction mixture," as used herein, refers to all the chemical contents in a reactor, such as monomer, comonomers, solvent, any amount of polymer or no polymer, and/or catalyst. Before a polymerization reaction begins, no typically polymer is present in the reactor.

The phrase "total weight of feed to the reactor," as used herein, refers to the total amount (weight) components, such as monomer, comonomer, solvent, hydrogen and/or catalyst, which are added to the respective reactor.

The phrase "steady state conditions," as used herein, refers to the reactor conditions when the variable under consideration, such as temperature, composition shows no change with respect to time.

The term "monomer type," as used herein, refers to the chemical composition and number of carbon atoms in a monomer.

The terms "comprising", "including", "having" and their derivatives are not intended to exclude the presence of any additional component, step or procedure, whether or not the same is specifically disclosed. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Determination of the Weight Fraction of Polymer and Weight Fraction of Solvent in a Phase.

The amount of polymer and solvent in a given binary solution is determined from the weight of the solution. The solvent is then evaporated completely, and the dried polymer is weighed. The weight of dry polymer is the amount of polymer initially present, and the weight of the solvent is determined from the difference between the weight of the solution and the weight of the polymer. From the amounts of solvent and polymer, one can calculate the weight fraction of each. Care should be taken to minimize the evaporation of low molecular weight fractions from the polymer. This can be accomplished by evaporating the solvent at low temperatures under vacuum (such as in a roto-vaporator).

For determination of phase boundaries (temperature and pressure), compositional measurements can be completely avoided by making up a solution of known composition, and then measuring the cloud point. When a solution of a particular fixed composition changes from a single liquid phase to two-liquid phases, either by a change in temperature or pressure or both, the appearance of the mixture changes from clear to cloudy, due to the difference in the refractive indices of the two phases. This test is very effective in determining very small amounts of the second liquid phase. Thus, it can be taken as the measurement of incipient phase separation, or in other words, the phase boundary.

GPC (Gel Permeation Chromatography)

For Gel Permeation Chromatography (GPC) measurements, the chromatographic system was a Polymer Laboratories Model PL-210. The column and carousel compartments were operated at 145° C. Four Polymer Laboratories, 20-um, Mixed-A LS columns were used with a solvent of 1,2,4-trichlorobenzene (TCB). The samples were prepared at a concentration of "0.1 g of polymer in 50 ml of solvent." The solvent used to prepare each sample contained 200 ppm of the antioxidant butylated hydroxytoluene (BHT). Samples were prepared by agitating lightly for 1-2 hours at 160° C. The injection volume was 200 microliters, and the flow rate was 1.0 ml/min Calibration of the GPC column set was performed with narrow molecular weight distribution, polystyrene standards, purchased from Varian Inc. (previously Polymer Laboratories). The polystyrene standard peak molecular weights were converted to polyethylene molecular weights using T. Williams and I. M. Ward, "The Construction of Polyethylene Calibration Curve for Gel Permeation Chromatography Using Polystyrene Fractions," J. Polym. Sci. Polym. Lett., 6, 631 (1968), incorporated herein by reference.

Density

Density was measured in accordance with ASTM D 792-08. About 16 g of polymer material was pressed (Monarch ASTM Hydraulic Press—Model No. CMG30H-12-ASTM) into a "one inch×one inch" die. The sample was pressed at 190° C., at 5600 lbf, for six minutes. Then the pressure was increased to 15 tonf, while simultaneously cooling the sample from 190° C. to 30° C., at 15° C./minute.

Octene Incorporation

Octene incorporation was measured using Nicolet Magna 560 spectrometer. Thin films of the calibration material, approximately 0.05-0.14 mm in thickness, were prepared by compression molding the polymer sample between Teflon coated sheets or aluminum foil. It was important that the films had a matte finish, to avoid interference fringes, when the films were examined in transmission mode on a FT-IR spectrometer. The absorbance of each standard was collected using 32 scans in the background. A sample spectra were collected, with a resolution of 4 $cm^{-1}$ or lower, 1 level of zero filling, and Happ-Genzel apodization function. The obtained spectra (standard) were baseline corrected at 2450 $cm^{-1}$. The second derivative of the normalized absorbance spectra was calculated over 4000-400 $cm^{-1}$ interval. To generate the calibration curve, the "peak-to-peak values" of the second derivative spectra for the controlled samples were calculated over the 1390-1363 $cm^{-1}$ interval, recorded, and plotted against the weight percent octene in each polymer control, as determined by $^{13}C$ NMR. The octene levels in the polymers prepared herein were calculated using a calibration curve.

Differential Scanning Calorimetry (DSC)

Polymer crystallinity was measured using Differential Scanning calorimetry (DSC) heating curves. Specifically, the heat of fusion was estimated using the controlled heating curves, and compared with the standard heat of fusion of 208 J/g. DSC analysis was done using a DSC Q1000 calorimeter. Baseline calibration of the DSC Q1000 was performed by using the calibration wizard in the software. First, a baseline was obtained by heating the cell from −80° C. to 280° C., without any sample in the aluminum DSC pan. After that, sapphire standards were used according to the instructions in the wizard. Then about "1-2 mg" of a fresh indium sample was analyzed, by heating the sample to 180° C., cooling the sample to 120° C., at a cooling rate of 10° C./min, followed by keeping the sample isothermally at 120° C. for one minute, followed by heating the sample from 120° C. to 180° C., at a heating rate of 10° C./min The heat of fusion and the onset of melting of the indium sample were determined, and checked to be within ±0.5° C. from 156.6° C. for the onset of melting, and within ±0.5 J/g from 28.71 J/g for the heat of fusion. Then deionized water was analyzed by cooling a small drop of fresh sample in the DSC pan from 25° C. to −30° C., at a cooling rate of 10° C./min. The sample was kept isothermally at −30° C. for two minutes, and heated to 30° C. at a heating rate of 10° C./min The onset of melting was determined and checked to be within ±0.5° C. from 0° C.

Samples of polymer were pressed at 1500 psi for 30 seconds into a thin film at a temperature of 350° F. About 5 to 8 mg of sample was weighed out and placed in a DSC pan. A lid was crimped on the pan to ensure a closed atmosphere. The sample pan was placed in the DSC cell, and then heated at a high rate of about 100° C./min, to a temperature of about 30° C. above the polymer melt temperature. The sample was kept at this temperature for about three minutes. Then the sample was cooled at a rate of 10° C./min to −40° C., and kept isothermally at that temperature for three minutes. Consequently the sample was heated at a rate of 10° C./min, until melting was complete, and the resulting enthalpy curves were analyzed.

Triple Detector GPC(RAD GPC)

A high temperature Triple Detector Gel Permeation Chromatography (3D-GPC) system, equipped with Robotic Assistant Delivery (RAD) system for sample preparation and sample injection, was used. The concentration detector is an Infra-red concentration detector (IR4 from Polymer Char, Valencia, Spain), which was used to determine the molecular weight and molecular weight distribution. Other two detectors are a Precision Detectors (Amherst, Mass.) 2-angle laser light scattering detector, Model 2040, and a 4-capillary differential viscometer detector, Model 150R, from Viscotek (Houston, Tex.). The 15° angle of the light scattering detector was used for calculation purposes. The detectors arranged were arranged in series in the following order: light scattering detector, IR-4 detector, and viscometer detector.

Data collection was performed using Polymer Char DM 100 Data acquisition box. The carrier solvent was 1,2,4-trichlorobenzene (TCB). The system was equipped with an on-line solvent degas device (from Agilent Technologies Inc.). The column compartment was operated at 150° C. The columns were four, OLEXIS 30 cm, 13 micron columns (from Agilent Technologies Inc.). The samples were prepared at 2.0 mg/mL using the RAD system. The chromatographic solvent (TCB) and the sample preparation solvent contained "200 ppm of butylated hydroxytoluene (BHT)," and both solvent sources were nitrogen sparged (continuous bubbling of nitrogen). The ethylene-based polymer samples were stirred gently at 155° C. for three hours. The injection volume was 200 μl, and the flow rate was 1.0 ml/minute.

Data was collected using TriSEC (excel-based) software. Calibration of the GPC columns was performed with 21 narrow, molecular weight distribution polystyrene standards. The molecular weights of the standards ranged from 580 to 8,400,000 g/mol, and were arranged in six "cocktail" mixtures, with at least a decade of separation between individual molecular weights.

The polystyrene standard peak molecular weights were converted to polyethylene molecular weights using the following equation (as described in T. Williams and I. M. Ward, J. Polym. Sci., Polym. Let., 6, 621 (1968)):

$$M_{polyethylene} = A(M_{polystyrene})^B \qquad (1),$$

where B has a value of 1.0, and the experimentally determined value of A is 0.38.

A first order polynomial was used to fit the respective polyethylene-equivalent calibration points obtained from equation (1) to their observed elution volumes. The actual polynomial fit was obtained, so as to relate the logarithm of polyethylene equivalent molecular weights to the observed elution volumes (and associated powers) for each polystyrene standard.

Conventional number, weight, and z-average molecular weights were calculated according to the following equations:

$$\overline{Mn} = \frac{\sum\limits_{i} Wf_i}{\sum\limits_{i} \left(\frac{Wf_i}{M_i}\right)}, \qquad (2)$$

$$\overline{Mw} = \frac{\sum\limits_{i} (Wf_i * M_i)}{\sum\limits_{i} Wf_i}, \qquad (3)$$

$$\overline{Mz} = \frac{\sum\limits_{i} (Wf_i * M_i^2)}{\sum\limits_{i} (Wf_i * M_i)}, \qquad (4)$$

where, $Wf_i$ is the weight fraction of the i-th component, and $M_i$ is the molecular weight of the i-th component.

The MWD was expressed as the ratio of the weight average molecular weight (Mw) to the number average molecular weight (Mn). The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

The Systematic Approach for the determination of each detector offset was implemented in a manner consistent with that published by Balke, Mourey, et al. (T. H. Mourey and S. T. Balke, in "Chromatography of Polymers (ACS Symposium Series, #521)," T. Provder Eds., An American Chemical Society Publication, 1993, Chpt. 12, p. 180; S. T. Balke, R. Thitiratsakul, R. Lew, P. Cheung, T. H. Mourey, in "Chromatography of Polymers (ACS Symposium Series, #521)," T. Provder Eds., An American Chemical Society Publication, 1993, Chpt 13, p. 199), using data obtained from the three detectors, while analyzing the broad linear polyethylene homopolymer (115,000 g/mol) and the narrow polystyrene standards. The Systematic Approach was used to optimize each detector offset to give molecular weight results as close as possible to those observed using the conventional GPC method. The overall injected concentration, used for the determinations of the molecular weight and intrinsic viscosity, was obtained from the sample infra-red area, and the infra-red detector calibration (or mass constant) from the linear polyethylene homopolymer of 115,000 g/mol. The chromatographic concentrations were assumed low enough to eliminate addressing $2^{nd}$ Virial coefficient effects (concentration effects on molecular weight).

The absolute molecular weight was calculated use the 15° laser light scattering signal and the IR concentration detector, $M_{PEi,abs} = K_{LS}*(LS_i)/(IR_i)$, using the same $K_{LS}$ calibration constant as in Equation 5. The paired data set of the $i^{th}$ slice of the IR response and LS response was adjusted using the determined "off-set" as discussed in the above Systematic Approach.

In addition to the above calculations, a set of alternative Mw, Mn, Mz and $M_{Z+1}$ [Mw (abs), Mz (abs), Mz (BB) and $M_{Z+1}$ (BB)] values were also calculated with the method proposed by Yau and Gillespie, (W. W. Yau and D. Gillespie, Polymer, 42, 8947-8958 (2001)), and determined from the following equations:

$$\overline{Mw}(abs) = K_{LS} * \frac{\sum\limits_{i} (LS_i)}{\sum\limits_{i} (IR_i)}, \qquad (5)$$

where, $K_{LS}$=LS-MW calibration constant. The response factor, $K_{LS}$, of the laser detector was determined using the certificated value for the weight average molecular weight of NIST 1475 (52,000 g/mol).

$$\overline{Mn}(\text{abs}) = K_{LS} \frac{\sum_i (IR_i)}{\sum (IR_i)/(LS_i/IR_i)} \quad (6)$$

$$\overline{Mz}(\text{abs}) = \frac{\sum_i IR_i * (LS_i/IR_i)^2}{\sum IR_i * (LS_i/IR_i)}, \quad (7)$$

$$\overline{Mz}(BB) = \frac{\sum_i (LS_i * M_i)}{\sum (LS_i)}, \quad (8)$$

$$\overline{M_{Z+1}}(BB) = \frac{\sum_i (LS_i * M_i^2)}{\sum (LS_i * M_i)}, \quad (9)$$

where $LS_i$ is the 15 degree LS signal, and the $M_i$ uses Equation 2, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on a decane flow marker dissolved in the eluting sample prepared in TCB. This flow rate marker was used to linearly correct the flow rate for all samples by alignment of the decane peaks.

Melt Index

Melt indexes (I2: 190° C./2.16 kg; and I10: 190° C./10.0 kg) were measured according to ASTM test method D1238.

Experimental

Representative Dispersion Polymerization (Inventive; Ethylene/Octene Copolymer)

Figure 2:
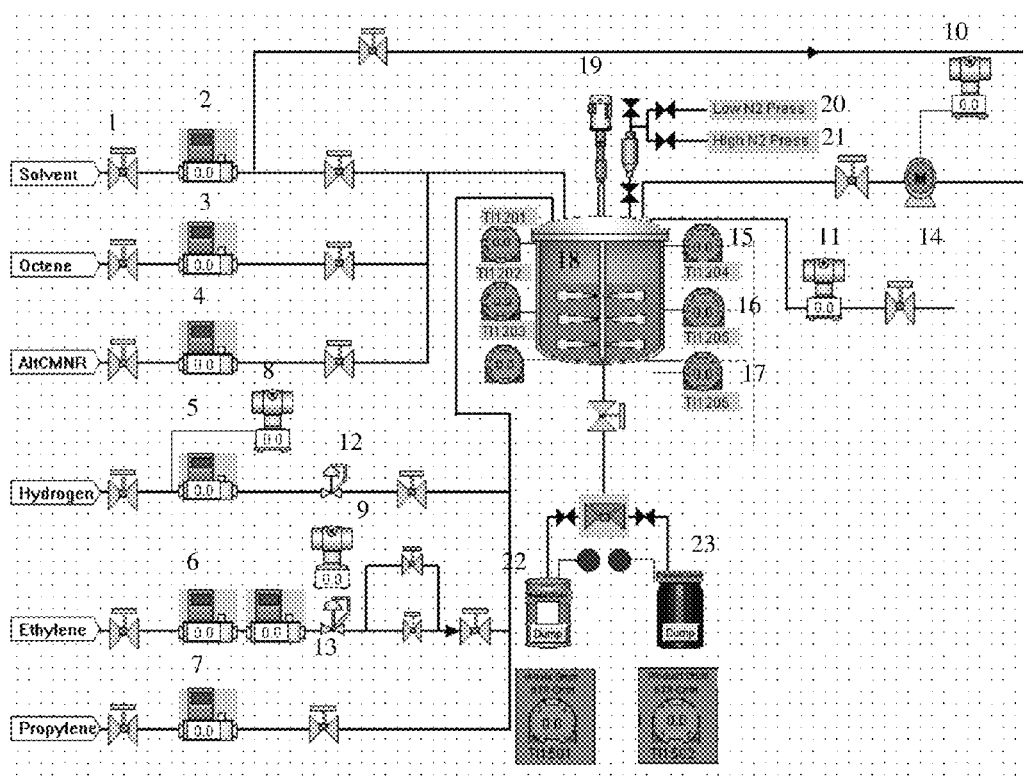
FIG. 2 is a flow schematic of an inventive polymerization process.

A semi-batch reactor, controlled using a Siemen's controller, was used in the polymerization. A flow schematic of the polymerization is shown in FIG. 2. The stainless steel, non-adiabatic, reactor [18] was equipped with a magnedrive agitator [19] and numerous ports for the feed, analytical probes and a coolant. The feed was monitored using automated block valves [1] and mass flow controllers [2-9], and a pressure regulator [13]. The catalyst addition was controlled by using a catalyst pump [14], while the pump pressure [10] was monitored. The catalyst can also be added manually, by using either high pressure [21] or low pressure nitrogen [20]. The non-adiabatic reactor was heated using electrical heaters, and the temperature was monitored using Type J thermocouples [15-17], while the reactor pressure was monitored [11]. At the end of the reaction, the product was either accumulated in a kettle [23] or in a dump drum [22]. For accuracy, hydrogen addition was controlled by using a back pressure regulator [12].

First, octene was added to the reactor at a flow rate of 160 g/min Second, isopentane solvent was added slowly to the reactor at 14-70 g/minute, to minimize evaporation of the solvent (bp=27.85° C.). Next, the reactor pressure was raised to 100 psi (6.9 bar) by adding ethylene. This step prevented vaporization of the isopentane, and the associated pressure build-up above the feed pressure of hydrogen. The reactor was then heated to 170° C., and ethylene was added to maintain a specified reactor pressure (450-750 psig).

Figure 3:
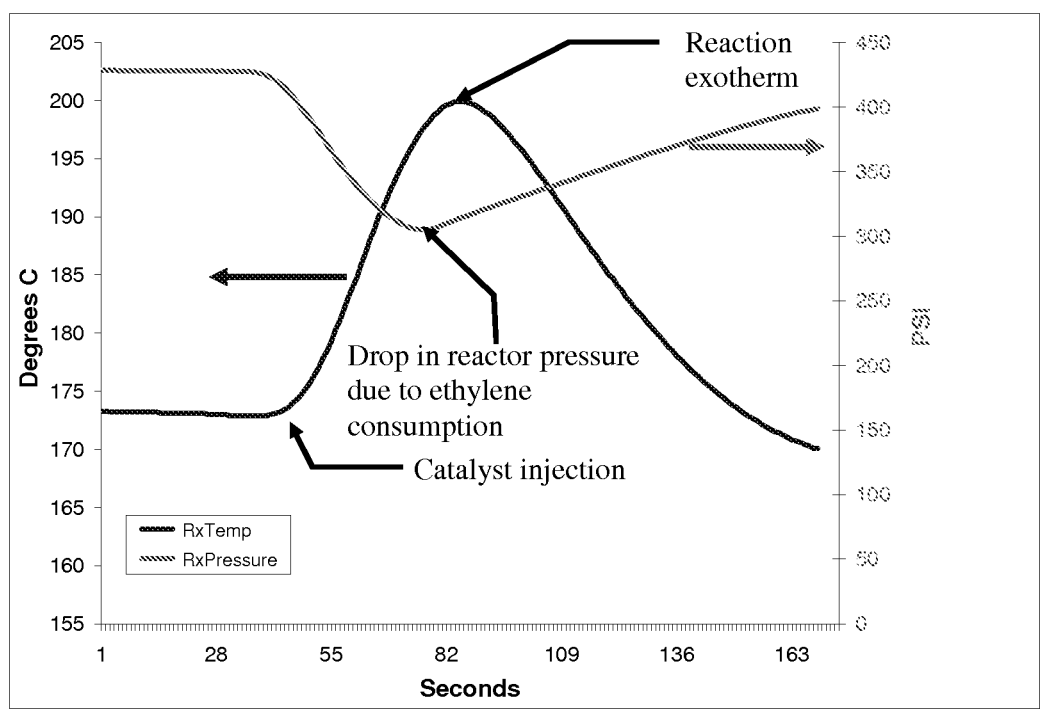
FIG. 3 depicts a run profile (T, P versus time) for an inventive polymerization process.

The octene, solvent (isopentane), and hydrogen additions were each controlled using a flow controller. The ethylene addition was controlled using a pressure regulator. The reaction mixture was stirred continuously, at 1400 rpm, to maintain homogenous conditions. To start the polymerization, a solution, containing the catalyst, cocatalyst and a scavenger, was automatically injected at 8 ml/min, using a high pressure reciprocating pump (ACCUFLOW SERIES II), rated up to 1500 psi. The catalyst was zirconium,dimethyl-[(2,2'-[1,3-propanediylbis(oxy-kO)]bis[3",5,5"-tris(1,1-dimethylethyl)-5'-methyl[1,1':3',1"-terphenyl]-2'-olato-kO]](2-)]-, (OC-6-33)-). See International Publication No. WO 2007/136494 (Cat. A11), fully incorporated herein by reference. This catalyst was activated using a tetrapentafluorophenyl-borate cocatalyst. A modified methylalumoxane was used as a scavenger. During the polymerization, ethylene was fed to the reactor to maintain a constant reactor pressure. Due to the exothermic nature of the ethylene polymerization, the reactor temperature increased, as the reactor pressure dropped, due to ethylene consumption (see FIG. 3). The reactor temperature was controlled by circulating a glycol coolant, at 40° C., through the walls of the reactor.

The polymerization was completed in about ten minutes, and the polymer was dumped, at 170° C., into a product kettle located under the reactor. The polymer sample was washed with ISOPAR E at 190° C. The sample was air dried, and subsequently vacuum dried, in a vacuum oven at 80° C., to remove residual solvent. The dried sample was analyzed for density, octene incorporation, and molecular weight characteristics.

Representative Solution Polymerization (Comparative)

A semi-batch reactor, controlled using a Siemen's controller, was used in the polymerization. A flow schematic of the polymerization is shown in FIG. 2. First, octene was added to the reactor at a flow rate of 160 g/min Next ISOPAR E solvent was added at a rate of 400 g/minute. The reactor was subsequently heated to 170° C., using electrical band heaters. Next, hydrogen was added at 160 sccm (standard cubic centimeters), followed by ethylene addition, at an amount required to reach the desired reactor pressure (380-750 psig). The octene, solvent (ISOPAR E), and hydrogen additions were each controlled using a flow controller. The ethylene addition was controlled using a pressure regulator. The reaction mixture was stirred continuously at 1400 rpm to maintain homogenous conditions. To start the polymerization, a solution, containing the catalyst, cocatalyst and a scavenger, was automatically injected at 8 ml/min, using a high pressure reciprocating pump (ACCUFLOW SERIES II), rated up to 1500 psi. The catalyst was zirconium, dimethyl[2,2'-[1,3-propanediyl-bis(oxy-kO)]bis[3",5,5"-tris(1,1-dimethylethyl)-5'-methyl [1,1':3',1"-terphenyl]-2'-olato-kO]](2-)]-,(OC-6-33)-). See International Publication No. WO 2007/136494 (Cat. A11), fully incorporated herein by reference. This catalyst was activated using a tetrapentafluorophenyl-borate cocatalyst. A modified methylalumoxane was used as a scavenger.

During the polymerization, ethylene was fed to the reactor to maintain a constant reactor pressure. Due to the exothermic nature of the ethylene polymerization, the reactor temperature increased as the reactor pressure dropped, due to ethylene consumption. The reactor temperature was controlled by circulating a glycol coolant, at 40° C., through the walls of the reactor.

The polymerization was completed in about ten minutes, and the polymer was dumped, at 170° C., into a product kettle located under the reactor. The polymer sample was washed with ISOPAR E at 190° C. The sample was air dried, and subsequently vacuum dried, in a vacuum oven at 80° C., to remove residual solvent. The dried sample was analyzed for density, octene incorporation, and molecular weight characteristics.

Polymerization conditions and polymer properties are shown in Tables 2-9. As shown in Table 2, the octene content was varied among the polymer samples. As shown in Table 3, the hydrogen content was varied among the polymer samples. The properties of two commercial polymers, prepared by a solution polymerization, are shown in Table 10.

TABLE 2

| Run # | Solvent | Temperature (° C.) | Pressure (psig) | Catalyst (micromol) | Cocatalyst (micromol) | Efficiency (C2 consumed/gm Zr) | Mol fraction ethylene | Mol fraction Octene | Mole C2/C8 |
|---|---|---|---|---|---|---|---|---|---|
| 1A | Isopar-E | 171.3 | 479.1 | 1.5 | 1.8 | 6.1E+05 | 0.227 | 0.096 | 2.37 |
| 2A | | 170 | 475.1 | 1.5 | 1.8 | 6.1E+05 | 0.225 | 0.096 | 2.35 |
| 3A | | 170.1 | 480.8 | 1.5 | 1.8 | 7.4E+05 | 0.228 | 0.047 | 4.90 |
| 4A | | 170.5 | 479.4 | 1.5 | 1.8 | 7.7E+05 | 0.227 | 0.047 | 4.87 |
| 5A | | 170.6 | 487.5 | 1.5 | 1.8 | 7.8E+05 | 0.231 | 0.024 | 9.74 |
| 6A | | 170.3 | 489.5 | 1.5 | 1.8 | 6.6E+05 | 0.232 | 0.023 | 9.92 |
| 7A | | 168.7 | 399 | 2 | 2.4 | 6.3E+05 | 0.184 | 0.139 | 1.32 |
| 8A | | 168.7 | 398.4 | 2 | 2.4 | 6.6E+05 | 0.185 | 0.138 | 1.33 |
| 9A | Isopentane | 170 | 697.3 | 1.25 | 1.5 | 7.2E+05 | 0.219 | 0.120 | 1.83 |
| 10A | | 170 | 700.2 | 1.25 | 1.5 | 6.7E+05 | 0.221 | 0.119 | 1.85 |
| 11A | | 170 | 727.9 | 1.25 | 1.5 | 7.0E+05 | 0.230 | 0.072 | 3.21 |
| 12A | | 170 | 737.8 | 1.25 | 1.5 | 8.0E+05 | 0.236 | 0.071 | 3.35 |
| 13A | | 170 | 750.8 | 1.25 | 1.5 | 7.7E+05 | 0.242 | 0.032 | 7.50 |
| 14A | | 170 | 766.7 | 1.25 | 1.5 | 6.3E+05 | 0.254 | 0.032 | 8.01 |
| 15A | | 171.1 | 620.9 | 1.25 | 1.5 | 5.1E+05 | 0.183 | 0.160 | 1.15 |
| 16A | | 169.5 | 613.6 | 1.25 | 1.5 | 6.03E+05 | 0.180 | 0.164 | 1.10 |
| 17A | | 170 | 691.5 | 1.25 | 1.5 | 1.0E+06 | 0.220 | 0.149 | 1.48 |
| 18A | | 170 | 701.3 | 1.25 | 1.5 | 1.1E+06 | 0.225 | 0.145 | 1.55 |
| 19A | | 170 | 688.6 | 1.25 | 1.5 | 4.5E+05 | 0.209 | 0.088 | 2.37 |
| 20A | | 170 | 699 | 2 | 2.4 | 7.7E+05 | 0.215 | 0.089 | 2.43 |
| 21A | | 172.1 | 729.4 | 2 | 2.4 | 5.8E+05 | 0.229 | 0.046 | 4.96 |
| 22A | | 170 | 720.4 | 2 | 2.4 | 5.33E+05 | 0.223 | 0.045 | 4.99 |
| 23A | | 170 | 725.3 | 2 | 2.4 | 5.5E+05 | 0.225 | 0.035 | 6.51 |
| 24A | | 170 | 767.9 | 1.75 | 2.1 | 2.9E+05 | 0.255 | 0.064 | 3.98 |
| 25A | | 170 | 726.5 | 1.75 | 2.1 | 5.2E+05 | 0.230 | 0.074 | 3.12 |

| Run # | Solvent | Temperature (° C.) | Hydrogen (sccm) | Yield | wt % Octene incorporation | Density | Molecular weight | Mw/Mn |
|---|---|---|---|---|---|---|---|---|
| 1A | Isopar-E | 171.3 | 30 | 77 | 32.9 | 0.8968 | 125,930 | 1.86 |
| 2A | | 170 | 30 | 112 | 31.85 | 0.8957 | 126,600 | 1.98 |
| 3A | | 170.1 | 30 | 79 | 20.16 | 0.9088 | 126,340 | 1.98 |
| 4A | | 170.5 | 30 | 88 | 20.07 | 0.9084 | 126,800 | 2.06 |
| 5A | | 170.6 | 30 | 81 | 16.59 | 0.9124 | 129,710 | 2.08 |
| 6A | | 170.3 | 30 | 76 | 16.03 | 0.9123 | 145,890 | 2.06 |
| 7A | | 168.7 | 30 | 160 | 28.53 | 0.8758 | 91,020 | 2.15 |
| 8A | | 168.7 | 30 | 155 | 28.11 | 0.8793 | 93,570 | 2.05 |
| 9A | Isopentane | 170 | 120 | 96 | 33.64 | 0.8791 | 75,680 | 3.05 |
| 10A | | 170 | 120 | 91 | 25.96 | 0.8768 | 64,450 | 2.73 |
| 11A | | 170 | 120 | 82 | 18.88 | 0.8809 | 82,600 | 3.10 |
| 12A | | 170 | 120 | 88 | 18.69 | 0.8759 | 84,230 | 2.73 |
| 13A | | 170 | 120 | 178 | 16.01 | 0.8569 | 95,370 | 3.24 |
| 14A | | 170 | 120 | 150 | 18.19 | 0.8793 | 98,420 | 2.87 |
| 15A | | 171.1 | 120 | 104.1 | 32.78 | 0.8712 | 89,110 | 4.39 |
| 16A | | 169.5 | 120 | 113.6 | 38.46 | 0.8699 | 87,680 | 3.26 |
| 17A | | 170 | 120 | 174.5 | 31.96 | 0.8572 | 70,530 | 2.81 |
| 18A | | 170 | 120 | 205.5 | 30.68 | 0.8579 | 65,500 | 3.79 |
| 19A | | 170 | 120 | 119.3 | 24.3 | 0.8586 | 67,000 | 3.06 |
| 20A | | 170 | 120 | 54.7 | 29.62 | 0.8623 | 66,160 | 3.54 |
| 21A | | 172.1 | 120 | 68 | 15.96 | 0.9035 | 91,620 | 4.95 |
| 22A | | 170 | 120 | 6 | 15.73 | 0.9018 | 101,630 | 3.38 |
| 23A | | 170 | 120 | 89 | 29.71 | 0.8971 | 101,430 | 4.04 |
| 24A | | 170 | 120 | 93 | 21.85 | 0.8861 | 99,780 | 3.23 |
| 25A | | 170 | 120 | 30 | 17.23 | 0.8818 | 84,740 | 3.99 |

TABLE 3

| Run # | Solvent | Temperature (° C.) | Pressure (psig) | Catalyst (micromol) | Cocatalyst (micromol) | Efficiency (C2 consumed/gm Zr) | Mol fraction ethylene | Mol fraction Octene | Mole C2/C8 |
|---|---|---|---|---|---|---|---|---|---|
| 1B | Isopar-E | 168.7 | 398.4 | 2 | 2.4 | 6.1E+05 | 0.181 | 0.140 | 1.30 |
| 2B | | 170.2 | 399.8 | 2 | 2.4 | 4.6E+05 | 0.185 | 0.139 | 1.34 |
| 3B | | 169 | 397.5 | 2 | 2.4 | 7.0E+05 | 0.184 | 0.139 | 1.33 |
| 4B | | 168.7 | 400.7 | 2 | 2.4 | 6.9E+05 | 0.178 | 0.139 | 1.28 |

TABLE 3-continued

| Run # | Solvent | | | | | | | |
|---|---|---|---|---|---|---|---|---|
| 5B | | 168.6 | 400.7 | 2 | 2.4 | 8.2E+05 | 0.186 | 0.138 | 1.35 |
| 6B | | 168.7 | 399 | 2 | 2.4 | 6.3E+05 | 0.184 | 0.139 | 1.32 |
| 7B | | 168.7 | 398.4 | 2 | 2.4 | 6.6E+05 | 0.185 | 0.138 | 1.33 |
| 8B | | 168.8 | 399 | 2 | 2.4 | 4.8E+05 | 0.182 | 0.139 | 1.31 |
| 9B | | 169 | 399.5 | 2 | 2.4 | 4.1E+05 | 0.187 | 0.137 | 1.36 |
| 10B | | 168.9 | 397.8 | 2 | 2.4 | 5.8E+05 | 0.178 | 0.139 | 1.28 |
| 11B | | 169.4 | 398.1 | 2 | 2.4 | 5.5E+05 | 0.174 | 0.141 | 1.24 |
| 12B | Isopentane | 168.5 | 610.8 | 1.25 | 1.5 | 2.8E+05 | 0.210 | 0.149 | 1.41 |
| 13B | | 169.1 | 614.5 | 1.25 | 1.5 | 5.9E+05 | 0.209 | 0.149 | 1.40 |
| 14B | | 170.5 | 623.5 | 2 | 2.4 | 5.8E+05 | 0.185 | 0.163 | 1.13 |
| 15B | | 170.3 | 619.1 | 2 | 2.4 | 5.5E+05 | 0.212 | 0.148 | 1.43 |
| 16B | | 170.3 | 613.9 | 1.25 | 1.5 | 3.9E+05 | 0.180 | 0.164 | 1.09 |
| 17B | | 169.3 | 613.1 | 1.25 | 1.5 | 7.1E+05 | 0.181 | 0.165 | 1.10 |
| 18B | | 170 | 610.2 | 1.25 | 1.5 | 6.0E+05 | 0.177 | 0.165 | 1.08 |
| 19B | | 169.7 | 613.6 | 1.25 | 1.5 | 5.3E+05 | 0.180 | 0.162 | 1.11 |
| 20B | | 169.8 | 610.8 | 1.25 | 1.5 | 3.0E+05 | 0.177 | 0.162 | 1.10 |
| 21B | | 169.7 | 610.8 | 1.25 | 1.5 | 4.0E+05 | 0.178 | 0.162 | 1.10 |
| 22B | | 171.1 | 620.9 | 1.25 | 1.5 | 5.1E+05 | 0.180 | 0.162 | 1.11 |
| 23B | | 169.5 | 613.6 | 1.25 | 1.5 | 6.0E+05 | 0.181 | 0.163 | 1.11 |

| Run # | Solvent | Temperature (° C.) | Hydrogen (sccm) | Yield | wt % Octene incorporation | Density | Molecular weight | Mw/Mn |
|---|---|---|---|---|---|---|---|---|
| 1B | Isopar-E | 168.7 | 10 | 170 | 27.66 | 0.8684 | 152,480 | 2.06 |
| 2B | | 170.2 | 10 | 109 | 26.31 | 0.8737 | 165,230 | 2.19 |
| 3B | | 169 | 20 | 172 | 27.76 | 0.8787 | 117,350 | 2.10 |
| 4B | | 168.7 | 20 | 189 | 27.69 | 0.8743 | 121,840 | 2.18 |
| 5B | | 168.6 | 20 | 230 | 27.74 | 0.8697 | 116,950 | 2.14 |
| 6B | | 168.7 | 30 | 160 | 28.53 | 0.8758 | 91,020 | 2.15 |
| 7B | | 168.7 | 30 | 155 | 28.11 | 0.8793 | 93,570 | 2.05 |
| 8B | | 168.8 | 50 | 108 | 28.09 | 0.8787 | 62,900 | 2.22 |
| 9B | | 169 | 50 | 102 | 27.13 | 0.8814 | 71,390 | 1.96 |
| 10B | | 168.9 | 75 | 142 | 29.98 | 0.8779 | 51,180 | 1.85 |
| 11B | | 169.4 | 75 | 141 | 32.41 | 0.8766 | 49,210 | 2.16 |
| 12B | Isopentane | 168.5 | 10 | 13.4 | 31.07 | 0.8727 | 342730 | 2.69 |
| 13B | | 169.1 | 10 | 43.6 | 30.37 | 0.8751 | 376080 | 2.97 |
| 14B | | 170.5 | 20 | 125.7 | 33.47 | 0.8625 | 255980 | 2.44 |
| 15B | | 170.3 | 20 | 154.6 | 34.14 | 0.8564 | 251930 | 2.80 |
| 16B | | 170.3 | 30 | 61.5 | 32.58 | 0.871 | 213700 | 2.62 |
| 17B | | 169.3 | 30 | 111.9 | 33.5 | 0.8706 | 216200 | 2.50 |
| 18B | | 170 | 50 | 34.4 | 35.93 | 0.8704 | 217480 | 2.88 |
| 19B | | 169.7 | 50 | 32.7 | 37.68 | 0.868 | 128700 | 2.62 |
| 20B | | 169.8 | 75 | 46.3 | 35.32 | 0.8714 | 106170 | 2.75 |
| 21B | | 169.7 | 75 | 17.6 | 38.43 | 0.8683 | 75660 | 2.55 |
| 22B | | 171.1 | 120 | 42.5 | 32.78 | 0.8712 | 89110 | 4.39 |
| 23B | | 169.5 | 120 | 57.2 | 38.46 | 0.8699 | 87680 | 3.26 |

TABLE 4

Dispersion Polymerizations (Inventive)

| Run # | Solvent | Temperature (° C.) | Pressure (psig) | Catalyst (micromol) | Cocatalyst (micromol) |
|---|---|---|---|---|---|
| 1 (12B) | Isopentane | 168.5 | 610.8 | 1.25 | 1.5 |
| 2 (13B) | | 169.1 | 614.5 | 1.25 | 1.5 |
| 3 (14B) | | 170.5 | 623.5 | 2 | 2.4 |
| 4 (15B) | | 170.3 | 619.1 | 2 | 2.4 |
| 5 (16B) | | 170.3 | 613.9 | 1.25 | 1.5 |
| 6 (17B) | | 169.3 | 613.1 | 1.25 | 1.5 |
| 7 (18B) | | 170 | 610.2 | 1.25 | 1.5 |
| 8 (19B) | | 169.7 | 613.6 | 1.25 | 1.5 |
| 9 (20B) | | 169.8 | 610.8 | 1.25 | 1.5 |
| 10 (21B) | | 169.7 | 610.8 | 1.25 | 1.5 |
| 11 (22B) | | 171.1 | 620.9 | 1.25 | 1.5 |
| 12 (23B) | | 169.5 | 613.6 | 1.25 | 1.5 |

TABLE 5

Dispersion Polymerizations (Inventive)

| Run # | Efficiency (C2 consumed/gm Zr) | Mol fraction ethylene | Mol fraction Octene | Mole C2/C8 | Hydrogen (sccm) |
|---|---|---|---|---|---|
| 1 (12B) | 2.8E+05 | 0.210 | 0.149 | 1.41 | 10 |
| 2 (13B) | 5.9E+05 | 0.209 | 0.149 | 1.40 | 10 |
| 3 (14B) | 5.8E+05 | 0.185 | 0.163 | 1.13 | 20 |
| 4 (15B) | 5.5E+05 | 0.212 | 0.148 | 1.43 | 20 |
| 5 (16B) | 3.9E+05 | 0.180 | 0.164 | 1.09 | 30 |
| 6 (17B) | 7.1E+05 | 0.181 | 0.165 | 1.10 | 30 |
| 7 (18B) | 6.0E+05 | 0.177 | 0.165 | 1.08 | 50 |
| 8 (19B) | 5.3E+05 | 0.180 | 0.162 | 1.11 | 50 |
| 9 (20B) | 3.0E+05 | 0.177 | 0.162 | 1.10 | 75 |
| 10 (21B) | 4.0E+05 | 0.178 | 0.162 | 1.10 | 75 |
| 11 (22B) | 5.1E+05 | 0.180 | 0.162 | 1.11 | 120 |
| 12 (23B) | 6.0E+05 | 0.181 | 0.163 | 1.11 | 120 |

TABLE 6

Solution Polymerizations (Comparative)

| Run # | Solvent | Temperature (° C.) | Pressure (psig) | Catalyst (micromol) | Cocatalyst (micromol) |
|---|---|---|---|---|---|
| A (1B) | ISOPAR-E | 168.7 | 398.4 | 2 | 2.4 |
| B (2B) |  | 170.2 | 399.8 | 2 | 2.4 |
| C (3B) |  | 169 | 397.5 | 2 | 2.4 |
| D (4B) |  | 168.7 | 400.7 | 2 | 2.4 |
| E (5B) |  | 168.6 | 400.7 | 2 | 2.4 |
| F (6B) |  | 168.7 | 399 | 2 | 2.4 |
| G (7B) |  | 168.7 | 398.4 | 2 | 2.4 |
| H (8B) |  | 168.8 | 399 | 2 | 2.4 |
| I (9B) |  | 169 | 399.5 | 2 | 2.4 |
| J (10B) |  | 168.9 | 397.8 | 2 | 2.4 |
| K (11B) |  | 169.4 | 398.1 | 2 | 2.4 |

TABLE 7

Solution Polymerizations (Comparative)

| Run # | Efficiency (C2 consumed/gm Zr) | Mol fraction ethylene | Mol fraction Octene | Mole C2/C8 | Hydrogen (sccm) |
|---|---|---|---|---|---|
| A (1B) | 6.1E+05 | 0.181 | 0.140 | 1.30 | 10 |
| B (2B) | 4.6E+05 | 0.185 | 0.139 | 1.34 | 10 |
| C (3B) | 7.0E+05 | 0.184 | 0.139 | 1.33 | 20 |
| D (4B) | 6.9E+05 | 0.178 | 0.139 | 1.28 | 20 |
| E (5B) | 8.2E+05 | 0.186 | 0.138 | 1.35 | 20 |
| F (6B) | 6.3E+05 | 0.184 | 0.139 | 1.32 | 30 |
| G (7B) | 6.6E+05 | 0.185 | 0.138 | 1.33 | 30 |
| H (8B) | 4.8E+05 | 0.182 | 0.139 | 1.31 | 50 |
| I (9B) | 4.1E+05 | 0.187 | 0.137 | 1.36 | 50 |
| J (10B) | 5.8E+05 | 0.178 | 0.139 | 1.28 | 75 |
| K (11B) | 5.5E+05 | 0.174 | 0.141 | 1.24 | 75 |

TABLE 8

Inventive Polymers

| Run # | Yield (gm) | wt % Octene incorp. | Density (g/cc) | Mw (abs) g/mole | MWD Mw(abs)/Mn(abs) | $I_2$ (g/10 min) | $I_{10}/I_2$ |
|---|---|---|---|---|---|---|---|
| 1 (12B) | 13.4 | 31.07 | 0.8727 | 342,730 | 2.69 | Low |  |
| 2 (13B) | 43.6 | 30.37 | 0.8751 | 376,080 | 2.97 |  |  |
| 3 (14B) | 125.7 | 33.47 | 0.8625 | 255,980 | 2.44 |  |  |
| 4 (15B) | 154.6 | 34.14 | 0.8564 | 251,930 | 2.80 |  |  |
| 5 (16B) | 61.5 | 32.58 | 0.871 | 213,700 | 2.62 |  |  |
| 6 (17B) | 111.9 | 33.5 | 0.8706 | 216,200 | 2.50 | 0.02 | 18.46 |
| 7 (18B) | 34.4 | 35.93 | 0.8704 | 217,480 | 2.88 |  |  |
| 8 (19B) | 32.7 | 37.68 | 0.868 | 128,700 | 2.62 | 1.35 | 11.44 |
| 9 (20B) | 46.3 | 35.32 | 0.8714 | 106,170 | 2.75 | 3.26 | 8.69 |
| 10 (21B) | 17.6 | 38.43 | 0.8683 | 75,660 | 2.55 |  |  |
| 11 (22B) | 42.5 | 32.78 | 0.8712 | 89,110 | 4.39 | 6.92 | 10.62 |
| 12 (23B) | 57.2 | 38.46 | 0.8699 | 87,680 | 3.26 | 7.92 | 10.93 |

TABLE 9

Comparative Polymers

| Run # | Yield (gm) | wt % Octene incorp. | Density (g/cc) | Mw(abs) (g/mole), | Mw(abs)/Mn(abs) | $I_2$ (g/10 min) | $I_{10}/I_2$ |
|---|---|---|---|---|---|---|---|
| A (1B) | 170 | 27.66 | 0.8684 | 152,480 | 2.06 | 0.27 | 9.78 |
| B (2B) | 109 | 26.31 | 0.8737 | 165,230 | 2.19 | 0.071 | 11.35 |
| C (3B) | 172 | 27.76 | 0.8787 | 117,350 | 2.10 | 0.58 | 9.04 |
| D (4B) | 189 | 27.69 | 0.8743 | 121,840 | 2.18 | 0.71 | 8.32 |
| E (5B) | 230 | 27.74 | 0.8697 | 116,950 | 2.14 | 0.88 | 8.99 |
| F (6B) | 160 | 28.53 | 0.8758 | 91,020 | 2.15 | 2.8 | 7.48 |
| G (7B) | 155 | 28.11 | 0.8793 | 93,570 | 2.05 | 2.31 | 7.42 |
| H (8B) | 108 | 28.09 | 0.8787 | 62,900 | 2.22 | 9.5 | 7.01 |
| I (9B) | 102 | 27.13 | 0.8814 | 71,390 | 1.96 | 7.85 | 6.76 |
| J (10B) | 142 | 29.98 | 0.8779 | 51,180 | 1.85 | 38.06 | 7.22 |
| K (11B) | 141 | 32.41 | 0.8766 | 49,210 | 2.16 | 41.67 | 6.97 |

TABLE 10

Commercial Polymers

| Comm. # | Octene Incorp. (wt %) | Density (g/cc) | Mw (g/mole) | Mw/Mn | $I_2$ (g/10 min) | $I_{10}/I_2$ |
|---|---|---|---|---|---|---|
| L* | 28.4 | 0.885 | 98,807 | 2.3 | 1 | 7.9 |
| M** | 18.1 | 0.902 | 112,322 | 2.9 | 1 | 9.0 |

*L = ENGAGE 8003 Polyolefin Elastomer
**M = AFFINITY PL1880 Polyolefin Plastomer Feed partitioning, before and after reaction completion, for Run#12 is shown in Table 11.

TABLE 11

| Phase | Octene mol fraction | Ethylene mol fraction | Molar Ethylene:Octene |
|---|---|---|---|
| Before reaction | | | |
| Solvent | 0.16 | 0.179 | 1.09 |
| At the end of the Reaction | | | |
| Solvent | 0.14 | 0.17 | 1.22 |
| Polymer | 0.18 | 0.14 | 0.76 |

Tables 4-7 describe some of the experimental conditions, including reactor pressure, temperature, and hydrogen concentration, for inventive dispersion polymerizations and comparative solution polymerizations. Tables 8 and 9 depict the polymer properties for the different reactor conditions. Increasing the hydrogen concentration, at a given monomer-comonomer concentration, lowered the molecular weight for repeated runs. However, it was discovered that at a given hydrogen concentration, polymerization in isopentane resulted in polymer with higher molecular weight than that made in ISOPAR-E (compare Run 1 (Table 8) and Run A (Table 9)). Further, it has been discovered that after a "two liquid phase" formation in isopentane, solubility of hydrogen in polymer phase was still lower by a factor of six, as compared to that for the isopentane solvent, which resulted in polymer with higher molecular weight, irrespective of the phase in which it was formed. This influence of hydrogen was also reflected in the melt index and $I_{10}/I_2$ ratio. The samples made at lower hydrogen concentration exhibited low melt index, and this value increased upon increasing the hydrogen concentration, due to corresponding lowering of the molecular weight.

Figure 4:
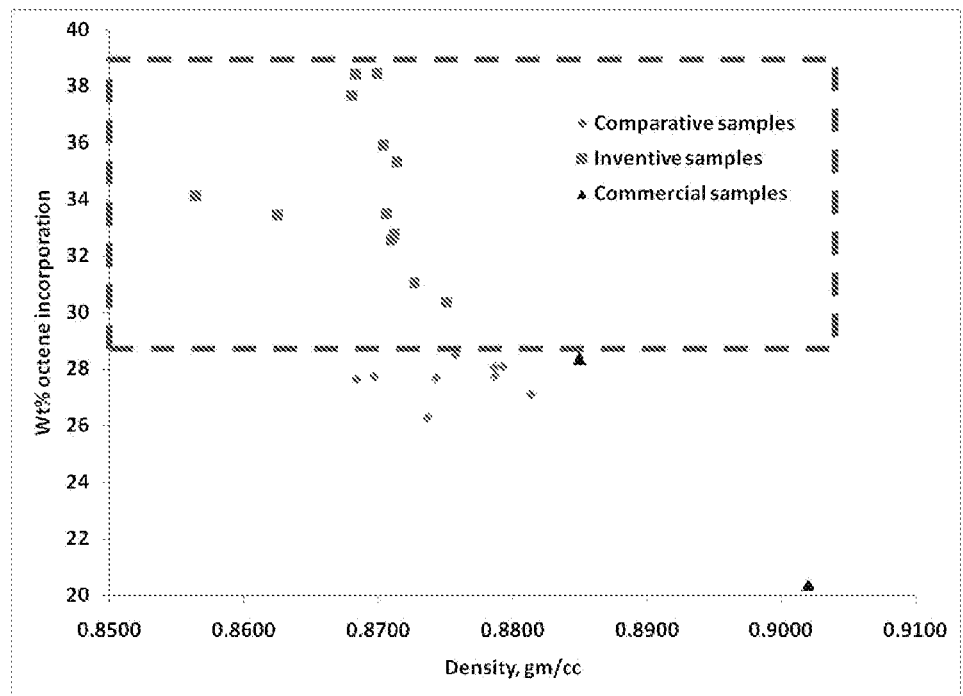
FIG. 4 is a plot of "weight percent octene incorporation versus density" of several inventive and comparative polymers.
Figure 5:
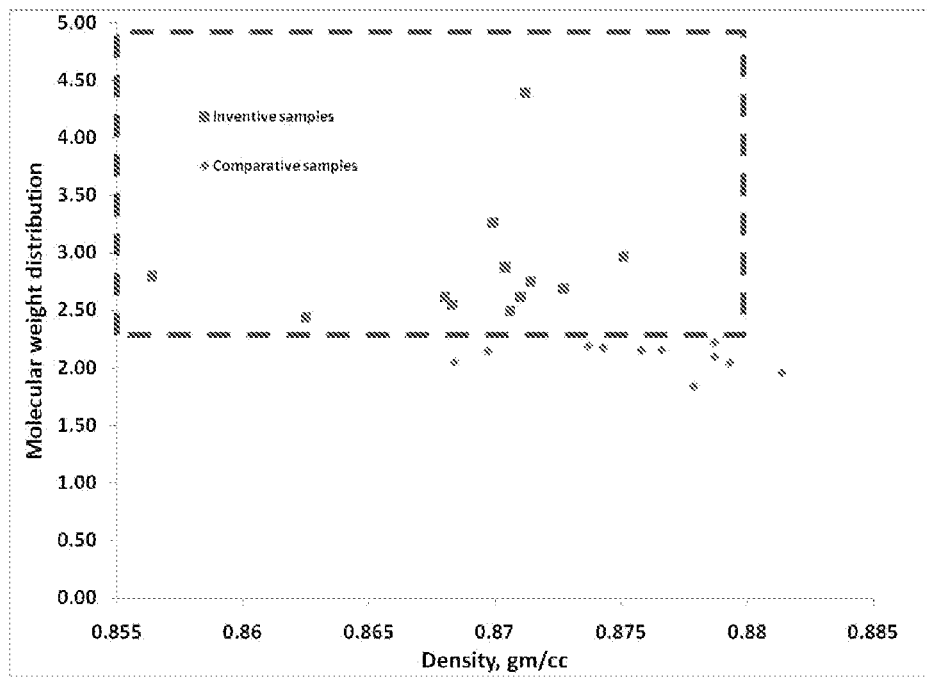
FIG. 5 is a plot of "molecular weight distribution versus density" of several inventive and comparative polymers.

It has also been discovered, as shown in FIG. 4 (see Tables 8 and 9), that the inventive polymers have higher octene incorporation, leading to lower polymer density. This higher octene incorporation may be explained by a change in the ethylene:octene ratio after two phase formation (increased in solvent phase, and decreased in polymer phase). Specifically, as shown in Table 11, it has been discovered that the ethylene:octene ratio changed from an initial value of 1.09, for the solution, to 0.76, in the polymer phase, due to higher octene solubility in the polymer phase. The increased octene solubility in the polymer phase leads to higher octene incorporation, and hence lower polymer density. It has also been discovered, as shown in FIG. 5 (see Tables 8 and 9), the inventive polymers have a broader molecular weight distributions (Mw(abs)/Mn(abs)), as compared to the comparative polymers at similar polymer densities. Thus, the inventive polymers have higher molecular weights (Mw(abs)), using about the same hydrogen concentration as in the solution polymerizations. The inventive polymers also have higher octene incorporation, and more, or comparable, amounts of long chain branching. Thus, the inventive polymers should have improved processibility (MWD and Mw) and improved toughness (amount of octene incorporation), compared to the comparative polymers.

Although the invention has been described in considerable detail in the preceding examples, this detail is for the purpose of illustration, and is not to be construed as a limitation on the invention, as described in the following claims.

The invention claimed is:

1. A polymerization process comprising polymerizing a reaction mixture comprising one or more monomer types, at least one catalyst, and at least one solvent, to form a polymer dispersion, and
    wherein the at least one catalyst is soluble in the at least one solvent, and
    wherein the polymer forms a dispersed phase in the solvent, and
    wherein the at least one solvent is a hydrocarbon; and
    wherein the polymerization temperature is greater than the highest melting point of the polymer, as determined by DSC; and
    wherein the reaction mixture comprises less than 100 ppm of a fluorocarbon or a fluorohydrocarbon, based on the weight of the reaction mixture, and wherein the polymerization temperature is greater than 120° C.

2. The process of claim 1, wherein the polymerization is run at a pressure P and at a temperature T, and wherein T is greater than the lower critical solution temperature T(LCST).

3. The process of claim 2, wherein the T is less than, or equal to, 200° C.

4. The process of claim 2, wherein the P is less than, or equal to, 10 MPa.

5. The process of claim 1, wherein the polymer concentration in the polymerization is less than, or equal to, 60 weight percent, based on the weight of the polymer dispersion.

6. The process of claim 1, wherein the polymerization temperature is greater than, or equal to, 150° C.

7. The process of claim 1, wherein the polymerization temperature is greater than, or equal to, 170° C.

8. The process of claim 1, wherein the reaction mixture comprises less than 10 ppm of a fluorocarbon or fluorohydrocarbon, based on the weight of the reaction mixture.

9. The process of claim 1, wherein the reaction mixture does not comprise a fluorocarbon or a fluorohydrocarbon.

10. The process of claim 1, wherein the polymerization is a continuous polymerization.

11. A composition comprising an ethylene-based polymer comprising at least the following properties:
    a) a weight average molecular weight (Mw(abs)) greater than, or equal to, 60,000 g/mole; and
    b) a molecular weight distribution (Mw(abs)/Mn(abs)) from 2.6 to 4.4, and wherein the ethylene-based polymer has a density from 0.85 to 0.90 g/cc, and is formed by the process of claim 1.

12. The composition of claim 11, wherein the ethylene-based polymer has an α-olefin incorporation greater than, or equal to, 30 weight percent, based on the weight of the polymer.

13. The composition claim 11, wherein the ethylene-based polymer has a density greater than 0.855 g/cc, and an α-olefin incorporation greater than, or equal to, 30 weight percent, based on the weight of the polymer.

14. The composition of claim 11, wherein the ethylene-based polymer has an I10/I2 ratio greater than, or equal to, 8.0.

* * * * *